United States Patent [19]

Dixon et al.

[11] Patent Number: 4,972,316
[45] Date of Patent: Nov. 20, 1990

[54] METHOD OF HANDLING DISK SECTOR ERRORS IN DASD CACHE

[75] Inventors: Jerry D. Dixon, Boca Raton; Guy G. Sotomayor, Jr., West Palm Beach, both of Fla.

[73] Assignee: International Business Machines Corporation, Armonk, N.Y.

[21] Appl. No.: 32,214

[22] Filed: Mar. 30, 1987

[51] Int. Cl.[5] .................. G06F 13/00; G06F 11/20; G06F 9/00
[52] U.S. Cl. .................. 364/200; 364/900
[58] Field of Search .............. 364/200, 900; 371/67

[56] References Cited

U.S. PATENT DOCUMENTS

| | | | |
|---|---|---|---|
| 3,997,876 | 12/1976 | Frush | 340/172.5 |
| 4,148,098 | 4/1979 | McCreight et al. | 364/200 |
| 4,168,541 | 9/1979 | DeKarke | 364/200 |
| 4,384,487 | 2/1984 | Rubinson et al. | 364/200 |
| 4,394,732 | 7/1983 | Swenson | 364/200 |
| 4,490,782 | 12/1984 | Dixon et al. | 364/200 |
| 4,498,146 | 2/1985 | Martinez | 364/900 |
| 4,523,275 | 6/1985 | Swenson et al. | 364/200 |
| 4,525,839 | 6/1985 | Nozawa et al. | 371/38 |
| 4,536,836 | 8/1985 | Dodd et al. | 364/200 |
| 4,593,354 | 6/1986 | Ushiro | 364/200 |
| 4,603,380 | 7/1986 | Easton et al. | 364/200 |
| 4,631,723 | 12/1986 | Rathbun et al. | 364/200 |
| 4,637,024 | 1/1987 | Dixon et al. | 371/67 |
| 4,638,425 | 1/1987 | Hartung | 364/200 |
| 4,680,703 | 7/1987 | Kriz | 364/200 |
| 4,685,082 | 8/1987 | Cheung et al. | 364/200 |
| 4,780,808 | 10/1988 | Moreno et al. | 364/200 |
| 4,807,110 | 2/1989 | Pomerene et al. | 364/200 |
| 4,814,903 | 3/1989 | Kulakowski | 360/48 |
| 4,821,254 | 4/1989 | Satoh et al. | 364/200 |
| 4,875,155 | 10/1989 | Iskiyan et al. | 364/200 |
| 4,914,530 | 4/1990 | Graham et al. | 360/48 |
| 4,916,605 | 4/1990 | Beardsley et al. | 364/200 |

FOREIGN PATENT DOCUMENTS 0151789 12/1984 European Pat. Off. .
0202381 9/1986 Japan ................ 371/38

OTHER PUBLICATIONS

IBM Technical Dis., "Dynamic Fixed File Alternate Sector Assignment and Management", vol. 23, No. 6, Nov. 1980.
IBM Technical Disclosure Bulletin, Handling Defective Tracks in a Cached Environment, vol. 29, No. 5, Oct. 1986, pp. 2116-2117.
IBM Technical Disclosure Bulletin, Handling Defective Tracks in a Cached Storage System, M. T. Benhase et al., vol. 25, No. 7B, Dec. 1982, pp. 3758-3759.
IBM Technical Disclosure Bulletin, Working Set Development Through Dual Layered Caching, J. D. Dixon et al., vol. 25, No. 11B, Apr. 1983, pp. 5998-6002.
IBM Technical Disclosure Bulletin, Handling Defective Buffer Areas, J. H. Christian et al., vol. 25, No. 3A, Aug. 1982, pp. 1150-1151.
Computer Design, An Optimum Disk Organization for a Virtual Memory System, W. W. Farr et al., Jun. 1971, pp. 49-51.
IBM Systems Journal, Cache-DASD Storage Design for Improving System Performance, C. P. Grossman, vol. 24, Nos. 3/4, 1985, pp. 316-334.

*Primary Examiner*—Andrew J. James
*Assistant Examiner*—Viet Q. Nguyen
*Attorney, Agent, or Firm*—Anibal Jose Cortina; Douglas R. McKechnie

[57] ABSTRACT

In a DASD caching system, in which pages of sectors of data are stored by reading in a desired sector and prefetching a plurality of adjacent sectors for later access, errors in disk storage media cause error signals to be generated. Such errors are handled by storing indications of which sectors have errors and which do not, and accessing such indications in response to later requests for such sectors. Such indications are stored in each page in the cache. Further, a history is maintained of which pages and sectors therein, were placed in the cache in the past.

7 Claims, 13 Drawing Sheets

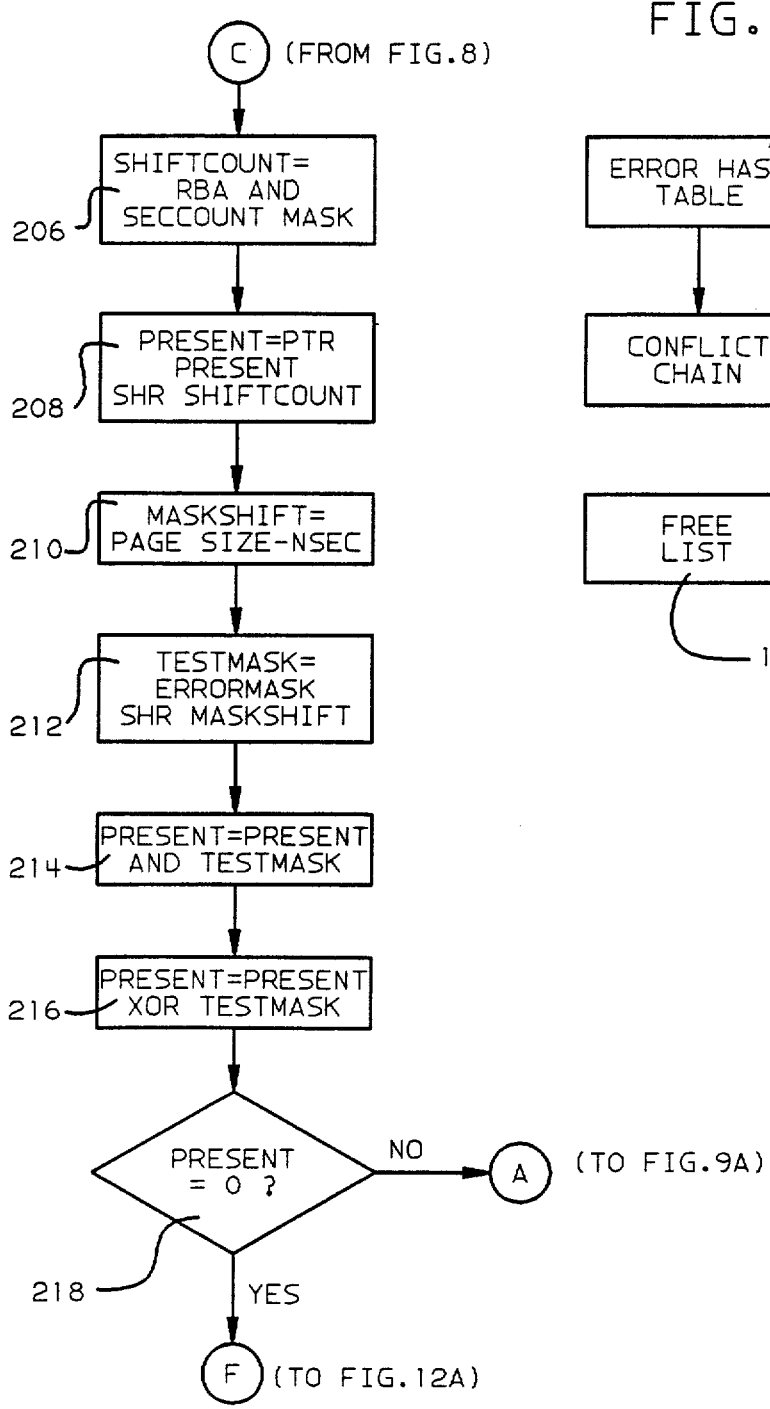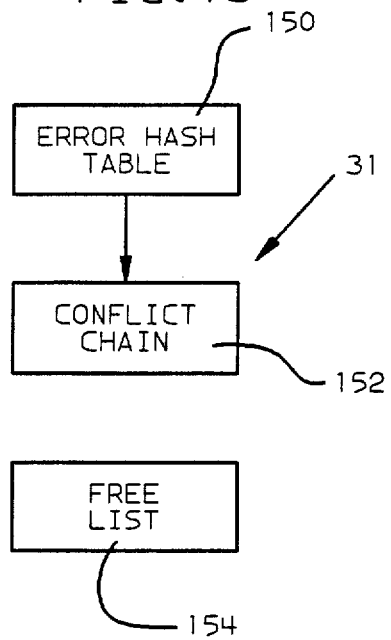

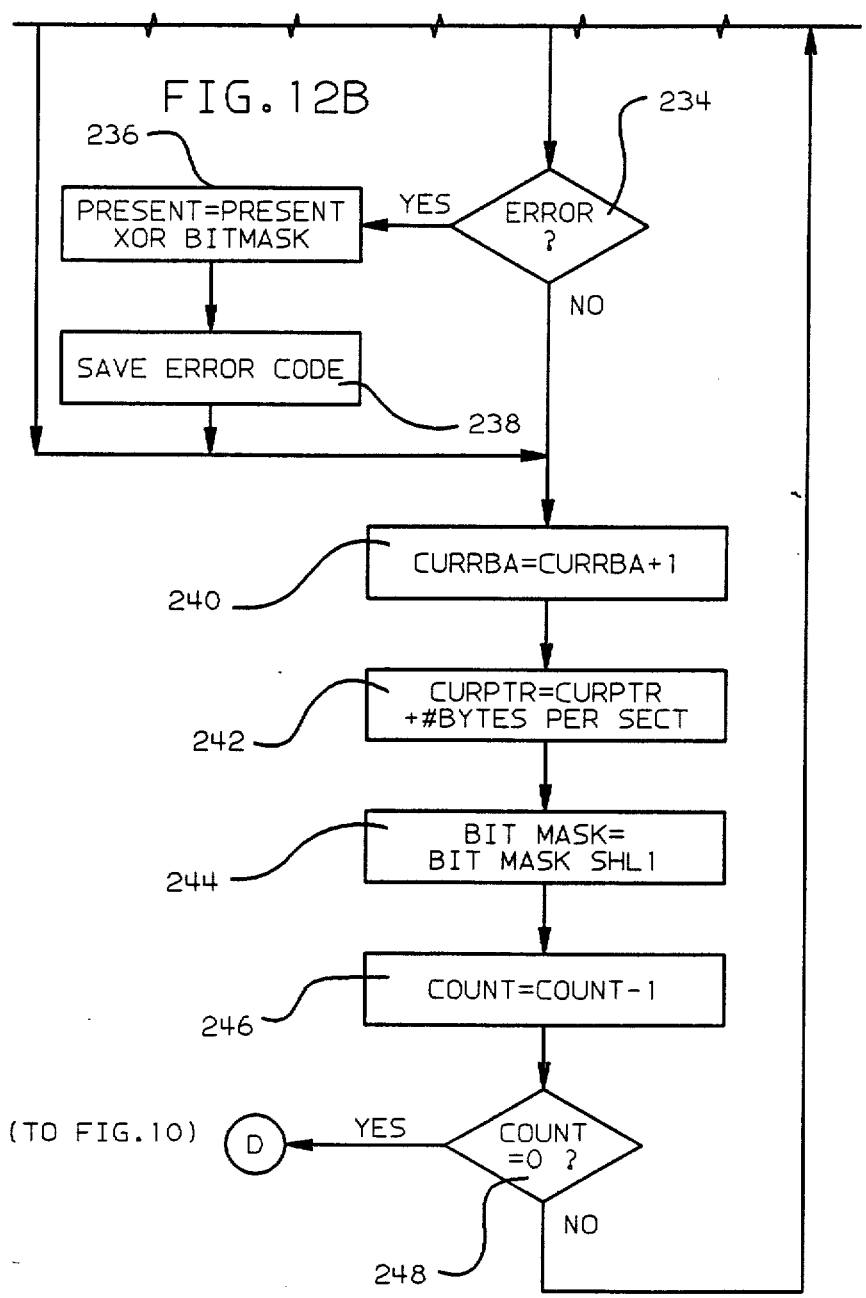

METHOD OF HANDLING DISK SECTOR ERRORS IN DASD CACHE

FIELD OF THE INVENTION

This invention relates to improvements in methods of operating a data processing system having a direct access storage device (DASD) cache, so as to handle disk sector errors due to defects in the storage media. More particularly, it relates to a method of operating a high performance personal computer to provide a low cost solution to the problem of handling bad sectors in a DASD cache.

BACKGROUND

It is well known to use fixed or hard disk drives to store information for processing in a processing unit connected to a main memory. Information is stored on disks according to a predetermined pattern of cylinders and sectors, each sector containing a predetermined number of bytes. A drive includes plural heads, there being one head for each side of a disk on which data is stored. Data is read from a disk one sector at a time. In order to access a desired sector, a head must first be moved to the cylinder containing the desired sector, the disk rotated past the head until the desired sector is reached and then the sector is read and the contents placed in a buffer. In looking at the total amount of time required to access data on a disk, the principal delay occurs during the physical movement of a head. Thus, when processing involves a large amount of I/0 activity, it is highly desirable to reduce the degree of head movement as much as possible to achieve improved performance.

DASD caching is a known technique and provides a way to improve system performance by reducing the amount of head movement and physical I/O activity. In accordance with such technique, a portion of main memory is used as a cache for storing pages of sectors of data. When a desired sector is initially accessed, not only that sector but one or more additional nearby sectors are read into the cache and subsequent accesses to such sectors is done at main memory speeds instead of at disk drive speeds. The improvement in performance comes about because of the probability that the next data to be processed is stored near data that has been previously processed.

One problem that is known in the art, arises because of the fact that defects exist in the disk storage media. Thus, sectors containing such defects are considered bad and cannot be used. Such bad sectors are normally identified by formatting and later uses thereof avoided by simply skipping a bad sector. The problem becomes more complex in caching systems because when a good sector is initially read into the cache, nearby sectors of the same page may contain errors or be bad. Within the prior art known to us, this problem has been solved in two ways. First, any page containing a bad sector is itself considered bad and an error signal or message is sent to the user. Second, the disk controller can be constructed so that only good sectors are sent to the cache. Such solution is a hardware solution and is relatively complex and costly to accomplish. The present invention is directed to a method that can be readily implemented by software or programming to provide an effective low cost solution particularly useful in relatively low cost, high performance personal computers.

SUMMARY OF THE INVENTION

One of the objects of the invention is to provide a novel method of handling disk sector errors in a DASD caching system.

Another object is to provide low cost solution to the problem of handling sector errors in a personal computer having a DASD caching system.

Still another object is to provide a method of handling sector errors in a DASD caching system, which method can be readily implemented by programming known hardware.

A further object is to provide a method that can be readily used with a commercially available disk operating system (DOS) to provide a caching function that is transparent to the user while readily solving the problem of handling disk errors.

Briefly, in accordance with the invention, as each page containing plural sectors is read into main storage, a separate table is built which stores information as to whether each sector is good or bad. Subsequent accesses to any sector are made by referencing or looking up the information in such table, and skipping any sector indicated to be bad or in error.

DRAWINGS

Other objects and advantages of the invention will be apparent from the following description taken in connection with the accompanying drawings wherein:

FIGS. 7A, 7B, 8, 9A, 9B, 10, 11, 12A and 12B are flow diagrams illustrating the method of the invention; and FIG. 13 is a schematic diagram illustrating the error list data structure.

DESCRIPTION

Figure 1:
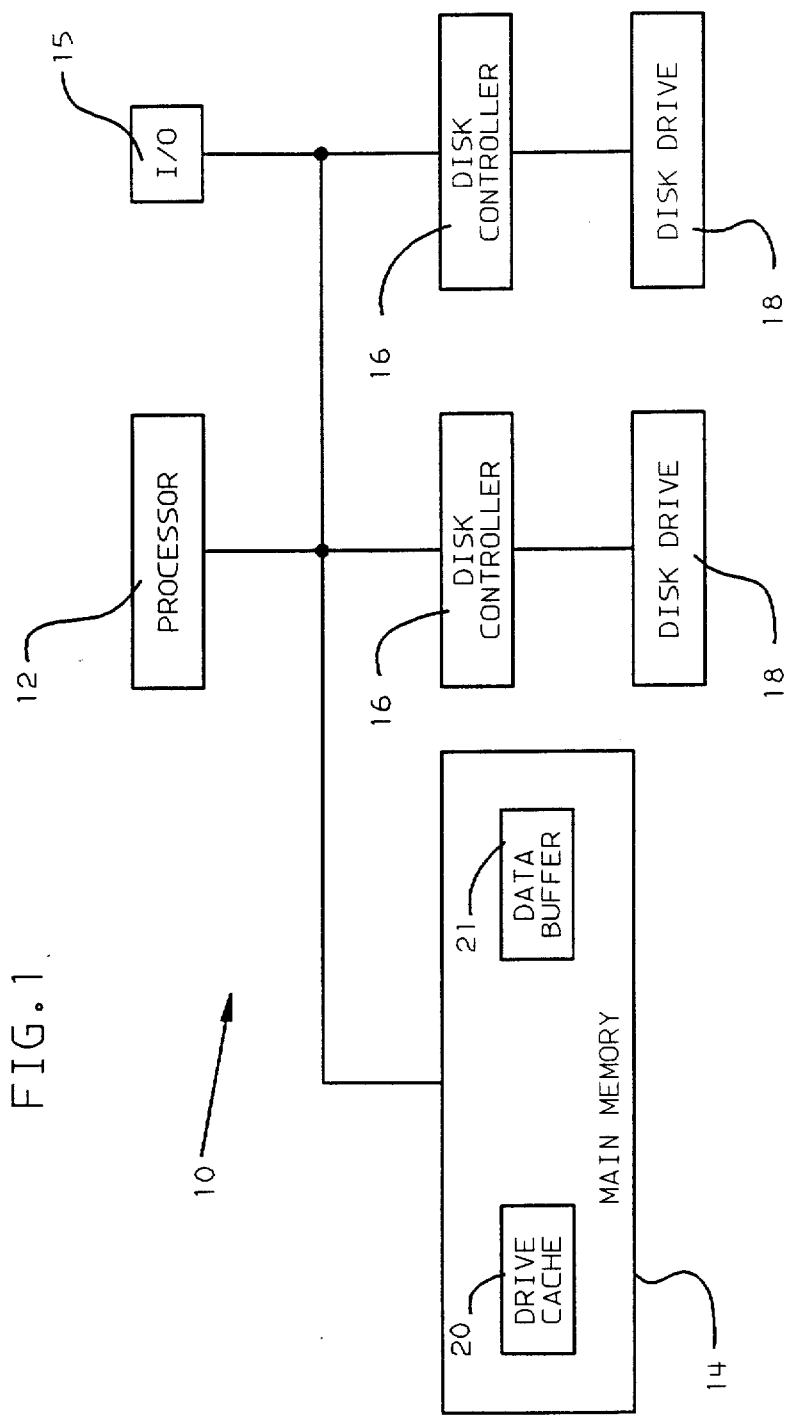
FIG. 1 is a schematic diagram of a personal computing system in which the method of the invention may be performed.

The following description is organized into two sections. The first describes the general operation of the DASD cache and hence describes the environment in which the method of the invention operates. The second section provides a detailed description of how media errors are handled. It is to be understood however, that the invention resides in the method and not in any particular software implementation.

CACHE

The method is preferably carried out in a conventional data processing system 10 such as the IBM Personal Computer AT. Such system 10 generally comprises a processor 12 connected to a main memory 14 and I/O devices 15. Such system may contain one or more disk controllers 16 each respectively connected to a disk drive 18. Formed as data structures in main memory 14 are a cache 20 and a data buffer 21, the latter being used by DOS to buffer each sector of data being transferred from the disk drives 18.

Figure 2:
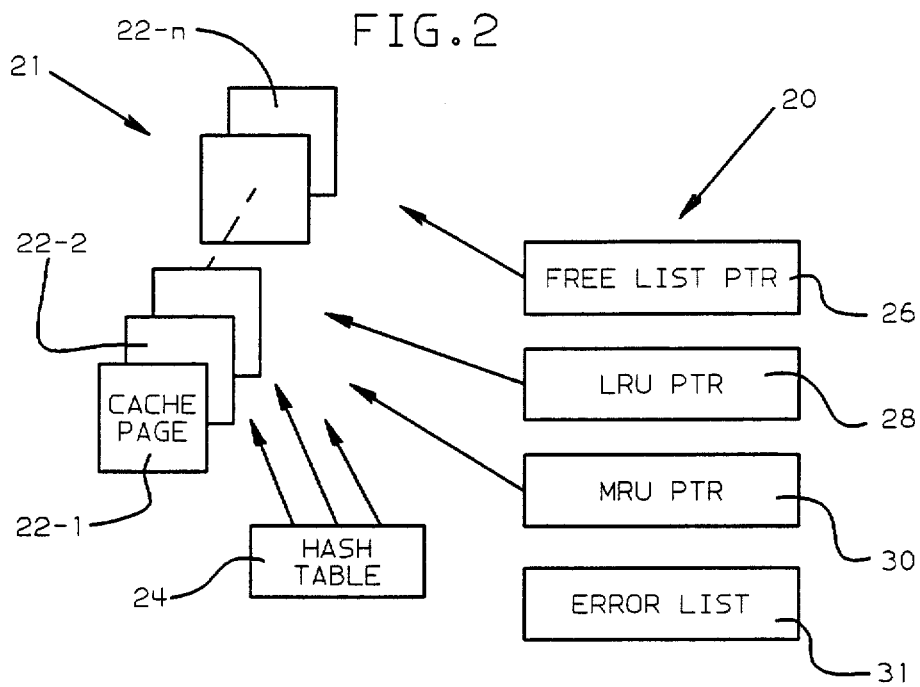
FIG. 2 is a schematic diagram of the cache data structure used in the invention.

Referring to FIG. 2, cache 20 comprises a page structure 21 comprising a multiplicity of cache pages 22-1 through 22-n. Cache 20 further contains a hash table 24, a free list pointer 26, an LRU (least recently used) pointer 28, a MRU (most recently used) pointer 30 and an error list 31, the details of which will now be described. These six parts, always present no matter how large the cache is, are:

- Cache Page 22—This defines the structure of a cache page in storage. It contains information to tag what physical page is represented, part of the LRU list, part of the hash table conflict list and the actual data of the cache page grouped by sectors.
- Least Recently Used (LRU) Pointer 28—This points to a cache page that is the least recently used page in the cache. That is, all of the other pages in the cache have been accessed more recently than the page pointed to by the LRU pointer.
- Most Recently Used (MRU) Pointer 30—This points to a cache page that is the most recently used page in the cache. That is, no page in the cache has been accessed more recently than the page pointer to by the MRU pointer.
- Cache Hash Table 24—This table is a vector of pointers to the cache pages. The vector is 311 entries long. When a sector is requested, the cache intercepts the request and hashes into this table to determine if the sector is in the cache. By using a hash table, very little time is taken to determine if a sector is in the cache, even if there are a large number of pages in the cache.
- Free List Pointer 26—This points to a cache page that is not presently being used in the cache. Initially all of the pages in the cache are on this list. When a page is found not to be in the cache, a page is removed from the free list and placed in the cache.
- Error List 31—This data structure, described in detail below, is used to indicate the history of page errors.

Table 1 lists the fields of a cache page 22. The fields in the structure are defined below. Note that all pointers are kept as two bytes. This is for a segmented architecture as is the Intel 8086/80186/80286/80386 family. The value stored in the pointer is the segment (8086/80186) or the selector (80286/80386). An assumed offset of 0 is associated with each data structure.

The meanings of the various fields are:

- Field 1 This field contains bits or flags that indicate which sectors in the page are present and contain valid data and which sectors are missing due to errors.
- Field 2 This field determines which drive this particular page is contained on.
- Field 3 This field contains the relative block address (RBA) of the starting sector of the page on the drive.
- Field 4 This field points to the next page that is less recently used than this page. If this is the least recently used page, then this field will contain the value 0. This field is also used to link pages together on the free list.
- Field 5 This field points to the next page that is more recently used than this page. If this is the most recently used page, then this field will contain the value 0.
- Field 6 This field points to the next page that is in the hash table's conflict list.
- Field 7 This field points to the previous page that is in the hash table's conflict list.
- Field 8 This field contains the data for the page as it came off of the DASD. If this page is referenced multiple times, the parts of the page that are requested will be copies from this buffer rather than being read from the device.

TABLE 1

| | CACHE PAGE 22 | |
|---|---|---|
| Field | Contents | Bytes |
| 1 | Present Flags | 2 |
| 2 | Drive ID | 1 |
| 3 | RBA | 4 |
| 4 | LRU Next | 2 |
| 5 | LRU Previous | 2 |
| 6 | Conflict Next | 2 |
| 7 | Conflict Previous | 2 |
| 8 | Page Buffer | 1-8 Sectors |

Each RBA is determined by the following formula:

$$RBA = ((CN \times NH) + HN) \times SPT + SN \quad \text{(Formula 1)}$$

where
- CN = Cylinder number
- NH = Number of heads per drive
- HN = Head number
- SPT = Number of sectors per track
- SN = Sector number The hash index is determined by the following formula:

$$Hash\ Index = RBa\ shr\ log\ (page\ size)\ mod\ 311 \quad \text{(Formula 2)}$$

where
- shr = RBA shifted right by number of bits according to the log to the base 2 of the page size
- page size = number of sectors per page
- mod = modulo functions which returns remainder The value of 311 is preferred for the hash table length because it is a relatively large prime number. Since 311 is a large prime number, it is unlikely that an application will use it or one of its multiples very often while accessing the cache. This keeps the conflict chains short by reducing the chance of an application getting into sync with the hashing algorithm so the hash can be resolved quickly.

Figure 3:
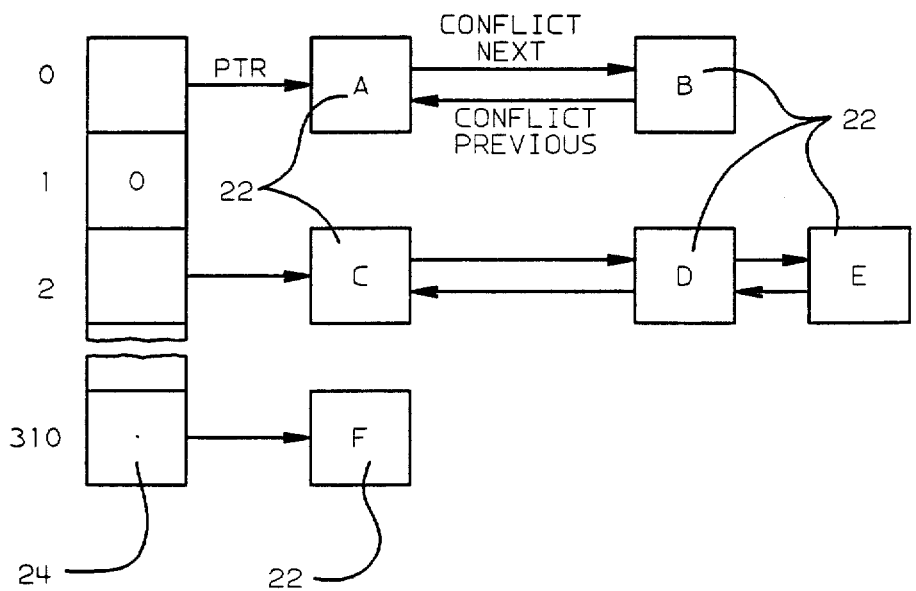
FIG. 3 is a schematic diagram illustrating how pages are referenced from a hash table.

Referring to FIG. 3, the various index positions 0-310 of table 24 will either contain a 0 or a pointer to the first, and perhaps only, cache page chained to such position. If the hash table entry that is selected contains the value 0, then there are no pages pointed to by the entry and the page is not in the cache. This is considered to be a "page fault". Index position 1, e.g., contains a zero indicating there are no pages associated therewith in the cache. If on the other hand, the hash table entry is not 0, the value there is used as a pointer to point to a cache page 22. The drive and RBA in a cache page are compared with the requested drive and RBA. If they turn out to be the same, it is considered to be a "page hit" and the requested page is in the cache. If they are not the same, the Conflict Next value in such page is used to point to the next cache page. If a value of 0 is picked up from this field, then the end of the conflict chain has been reached and the requested page is not in the cache. This is again a "page fault". As illustrated, pages A-F are claimed from table 24 to form three separate chains of different lengths.

If a page 22 is found in the cache, the conflict chain for that hash table entry is reordered so that the found page is at the head of the conflict chain. The idea here is that if the conflict chain is kept in a most recently used order, then the scans down the conflict chain will be short because of the probability of a recently used page being accessed again. This is especially true if a cache page represents more than one physical sector.

If a page is found not to be in the cache, a new page is allocated (the exact means of accomplishing this will be discussed later). A page is read in from a disk and placed in the page buffer (Field 8). The new cache page structure is then constructed relative to the hash table with similar algorithms to those that were used to determine that the page was not in the cache. There is one important difference. The conflict chain for the hash table entry is not resolved. Instead the new page is inserted at the head of the conflict chain so that the conflict chains remain ordered as to most recently used. Also, the LRU chain pointers are reordered to show this page as most recently used.

Figure 4:
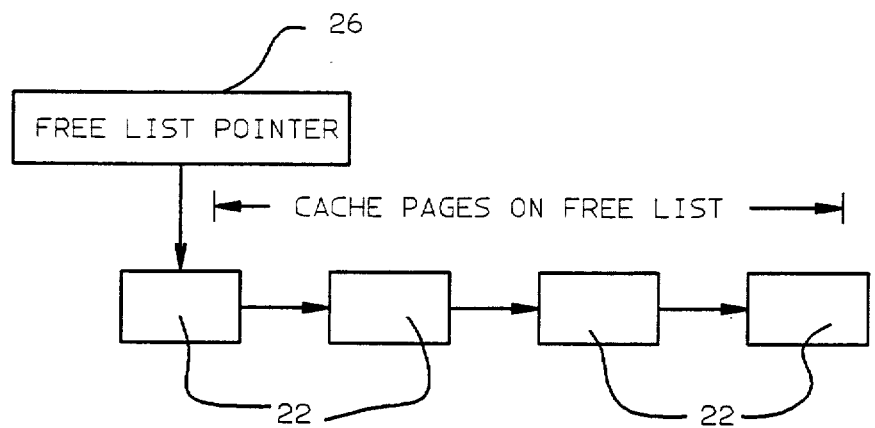
FIG. 4 is a schematic diagram illustrating the free page list.
Figure 5:
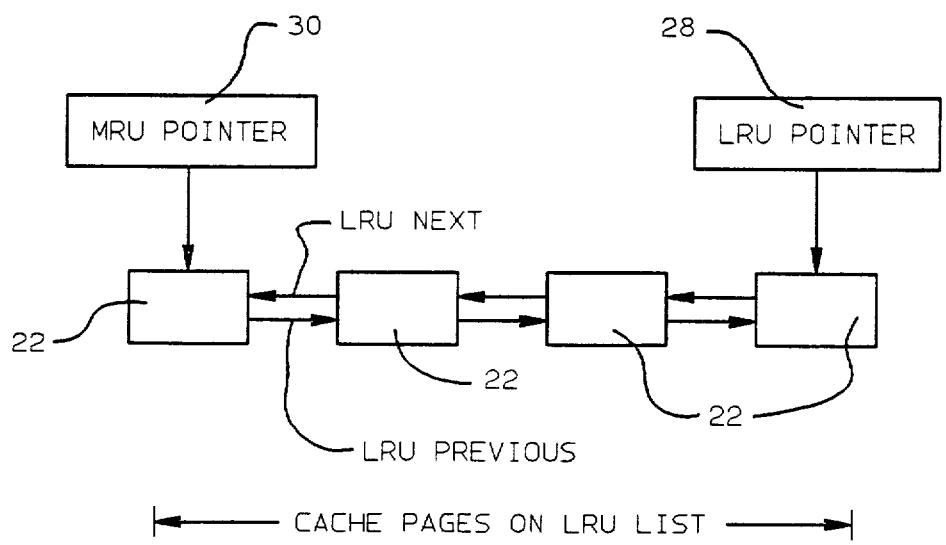
FIG. 5 is a schematic diagram illustrating the LRU list chain.

A new page 22 is placed in cache 20 only when a requested sector is found not to be in the cache. The method was described in the previous section. This section will describe how a page is actually allocated so that it can be placed in the cache structure. There are two ways that a page may be allocated. If there is one or more pages in the cache free list, one page is removed from the free list and allocated for the new page. If there are no pages in the cache free list, the page that is pointed to by the LRU pointer is removed from the cache structure and re-allocated to the new page. FIG. 4 shows the structure of the cache free list. Free list pointer 26 point to the cache page 22 at the head of the list and one of the pointer fields points to the next free page. Initially, all cache pages are on the free list and no pages are pointed to by the hash table or the LRU list. As requests are made to the disk and there are cache page faults, more and more pages 22 will be removed from the free list until finally there are no longer any pages in the free list. When this occurs, the pages are reused based on the LRU list. FIG. 5 shows the structure of the LRU list with the LRU and MRU pointers 28 and 30 pointing to the ends of the list and the various pages 22 being chained by the LRU Next the LRU Previous pointers.

Since the cache always tries to allocate from the free list before removing pages from the LRU list, it is possible to dynamically add more pages to the cache once the cache is operational. This is especially desirable if the cache is implemented in software only. The reasoning behind this is that an operating system may see that main storage is not being fully utilized and may decide that some of that storage could be put to good use by giving some (or all) of the unused storage to the cache.

The converse (removing pages from the cache) is possible also by removing one or more pages from the end of the LRU list. This may not be desirable since the pages cannot be guaranteed to be physically contiguous in storage. But given a sufficiently sophisticated operating system the fragmentation of storage may not be a problem.

Whenever a page is accessed in the cache (either by a hit or by a new page being allocated), that page is removed from its current position in the LRU list and moved to the head of the list pointed to by the MRU pointer. Since the cache page structure is pointer based, the moving of pages in the LRU list is accomplished by simply moving pointer values around, in a known manner.

Cache pinning (placing a page or pages in the cache permanently) is easily accomplished with this design. To pin a page all that is needed to be done is to remove the page from the LRU list. Since pages are reallocated from the LRU list, a page that is not in the LRU list can never be reallocated. Pinning is desirable when certain pages are not accessed often enough to keep them in the cache. This would allow file system structures such as directories, allocation bit maps, system files, etc. to be kept in the cache for good performance without them being flushed by a read of a large file. In order to perform cache pinning in a useful manner it is desirable to have cooperation between the cache and the operating system, or at least a utility of the operating system. The utility would inform the cache that until signalled otherwise, the requested pages are not to be placed in the LRU. The utility would then read the sector(s), files(s), etc. and then signal the cache that all further cache requests should place the pages into the LRU.

The cache would have to be sensitive to the fact that some pages may not be part of the LRU and should not be inserted into the LRU when accessed. This can be done when a cache hit occurs by checking to see if the LRU Next and Previous fields are 0. If they are, the page is not to be placed in the LRU. In this way, no extra bits or flags need to be made part of the cache page structure to support pinning.

Figure 6:
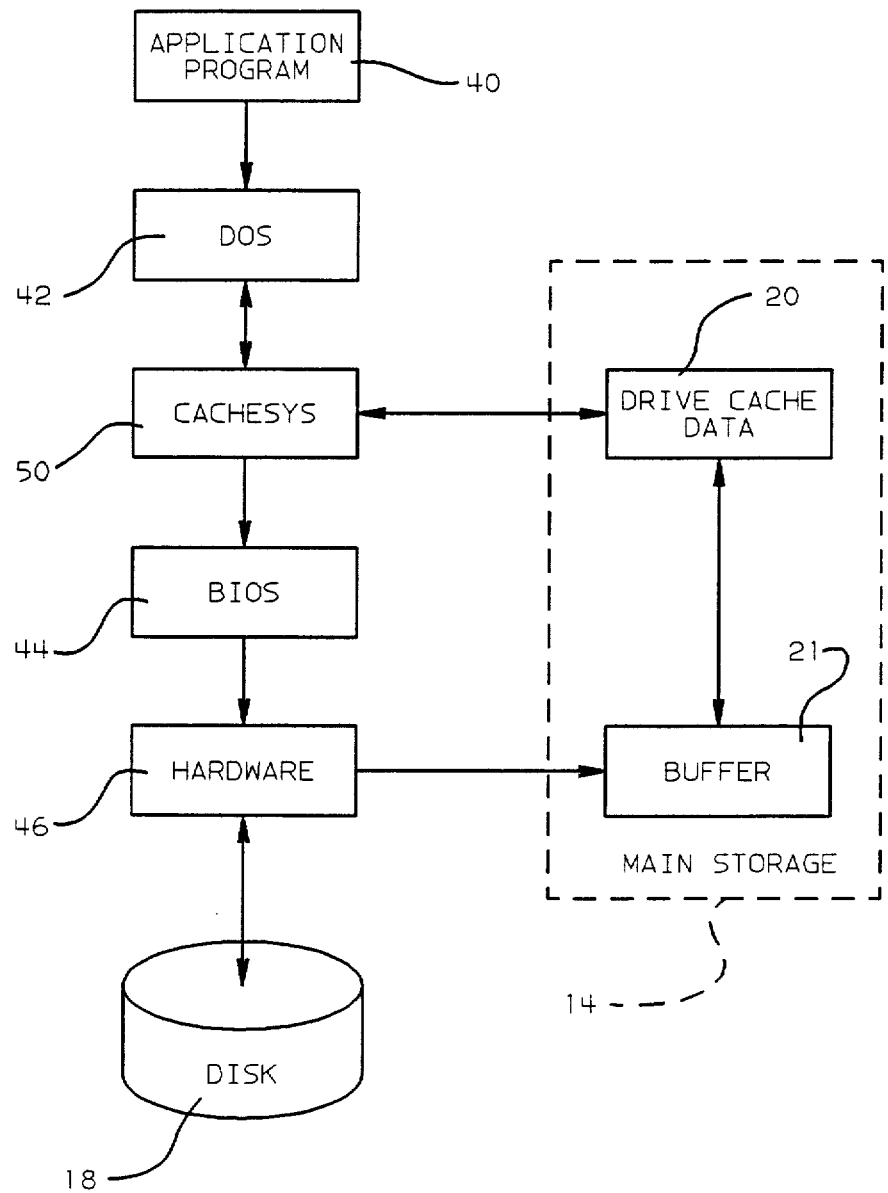
FIG. 6 is a schematic diagram illustrating how various programs and hardware are related generally, to the invention.

FIG. 6 illustrates the general manner in which the method of the invention is embodied in a set of procedures called CACHESYS interacts with conventional programs and hardware to carry out the method of the invention. When an application program 40 needs to read data from a disk 18, DOS 42 is invoked and it, by means of a conventional interrupt 13H, call would invoke basic input/output system (BIOS) 44. CACHESYS 50 is interposed between DOS 42 and BIOS 44 and may be constructed as an interrupt handling routine for intercepting and carrying out the various procedures described in detail below. It appears to DOS to act as BIOS 44 and relative to BIOS 44, CACHESYS system appears like DOS 42. That is, the operation of CACHESYS 50 is transparent to DOS 42 and BIOS 44. Under the control of BIOS 44, data from disk 18 would be transmitted through hardware 46 to data buffer 21 in main storage and then made available to the application program through DOS, in conventional manner. When CACHESYS 50 is operational, and in response to intercepting the interrupt 13H call, if the desired sector containing the needed data is already in drive cache 20, the data will then be placed in buffer 21 and made available to the application program. If the data is not in cache 20, then CACHESYS would invoke BIOS 44 to have the data read from disk 18 into buffer 21, from whence it will be made available to the application program. Further, on the instance of first usage of such data, it would also be placed in cache 20 to be available for subsequent operations. Additionally, nearby consecutive sectors would also be prefetched or read into cache 20.

Figure 7A:
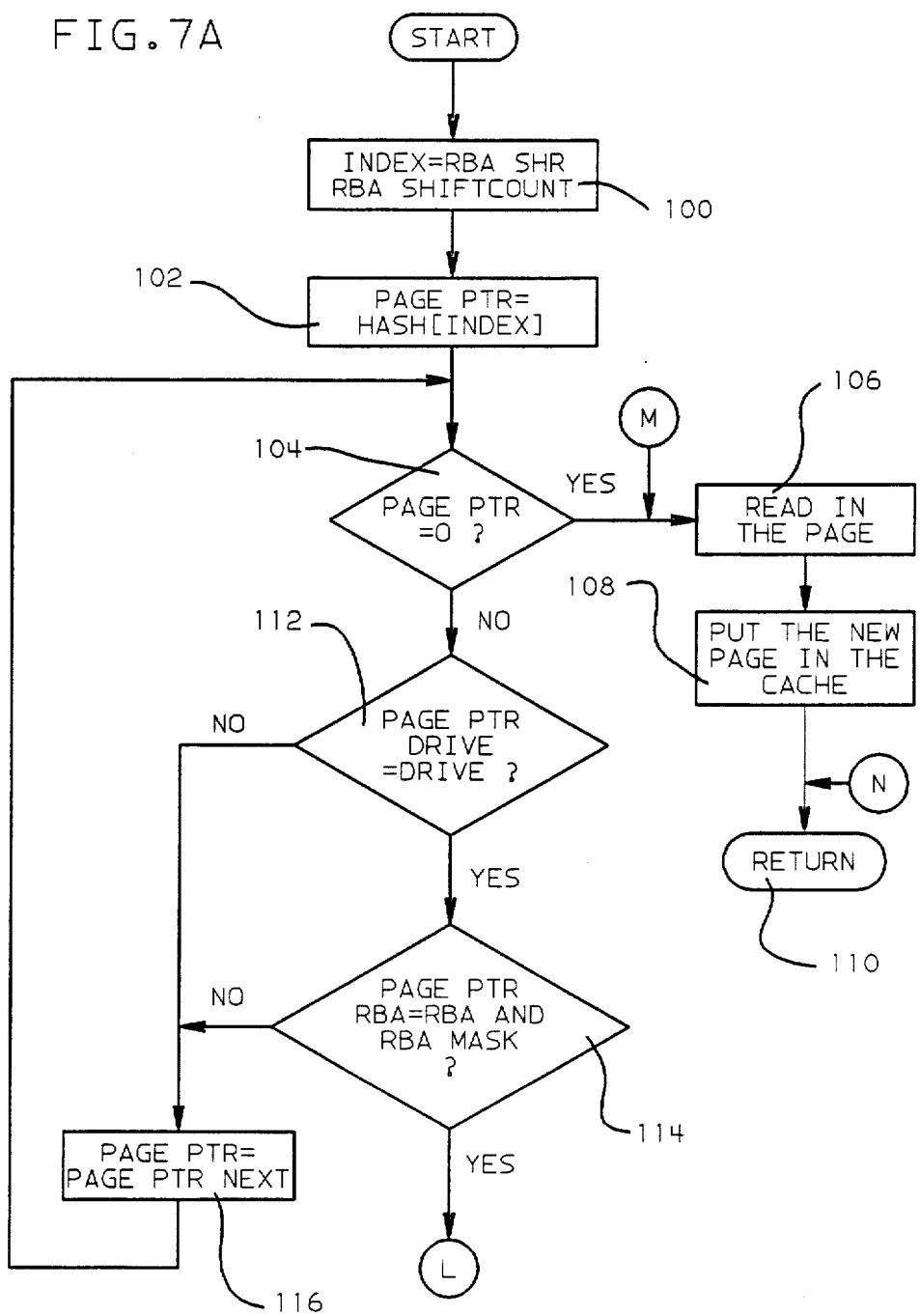
Figure 7B:
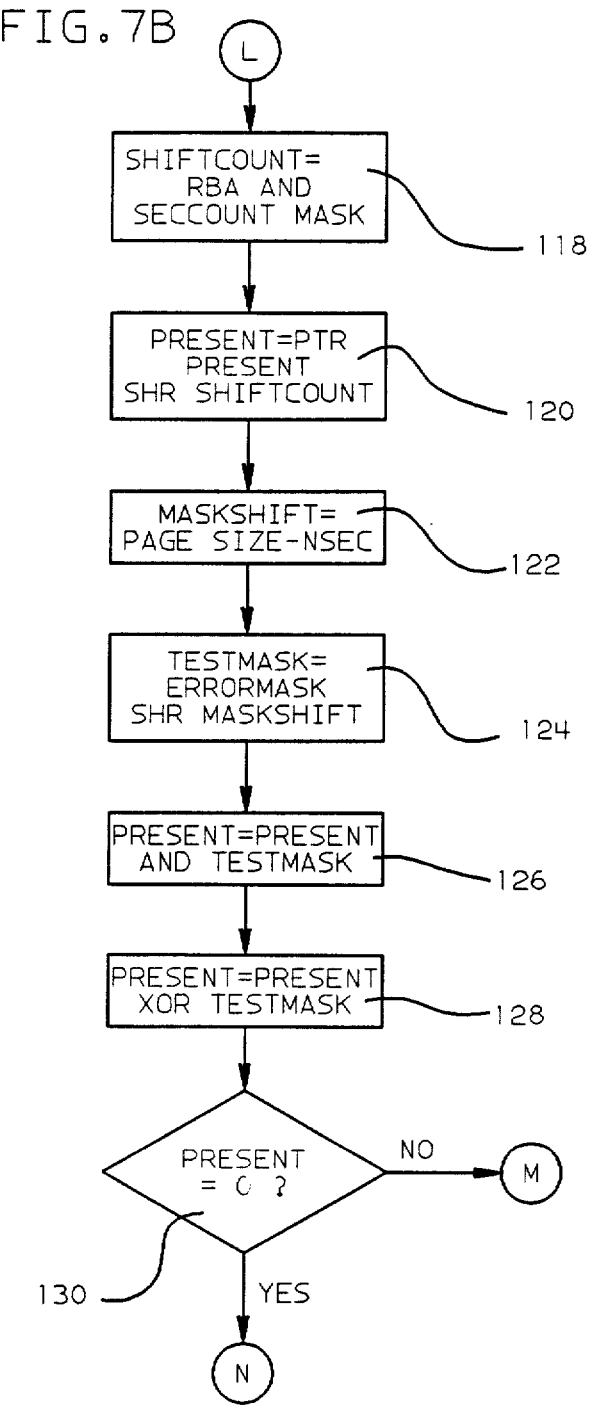

Referring now to FIG. 7, when the procedures 50 are invoked as by intercepting the interrupt, step 100 determines or calculates the index into hash table 24 from the RBA of the desired sector. Step 102 then places the contents of the hash table at the index into a variable known as PAGE PTR and step 104 determines whether or no PAGE PTR equals zero to signify the end of a conflict chain. If it is, then a new page is read in step 106 and the new page is placed in the cache by step 108, after which step 110 returns to DOS and the application. If as a result of step 104, the page pointer is not equal to zero, then steps 112 and 114 determine if the page pointer is pointing to the desired page. This is done by first comparing the page pointer drive specification with the desired drive containing the data, in step 112, and if it is the correct drive, then step 114 compares the RBA of the page pointer with the RBA ANDed with the RBA mask. If steps 112 and 114 produce negative results, then step 116 updates the page pointer to point to the next page in the conflict chain and this process will continue until the desired page is reached whereupon the positive results in step 114 passes to 118.

The general purpose of steps 118-130 is to check whether or not the requested sectors are in the cache page. If they are, then a positive result from step 130 passes to return step 110 and the sector data is transferred from its cache page 22 to buffer 21. If they are not, then the negative result from step 130 returns to step 106 for reading in the page containing the desired sectors. In order to understand what happens during steps 118-130, it will now be desirable to consider step 106 and how a new page is read into the cache.

Step 106 is a general step and the detailed step involved therein are shown in FIGS. 8-12. However, before describing in detail these various steps, an explanation will be made of some variables and data structures used therein.

ERROR HANDLING

Table 2 lists the meaning of different variables used in the process. These variables are initialized in the beginning of the process. Error list 31 (FIG. 2) includes, as schematically shown in FIG. 13, an error hash table 150, conflict chain 152 and free list 154 there being one entry per page. The conflict chains and free lists are constructed and handled similar to the procedures described relative to FIGS. 3 and 4. A hash table is used because even though the error list is relatively small, it is scanned every time there is a physical I/O and it is desirable to keep the search time as short as possible. Hash table 150 is 64 indexes long, such length being chosen because it is a power of two and the page RBA can be manipulated easily with shifts and a mask rather than with a divide. The justification for this over a prime number of entries, is that errors on a disk are usually fairly uniformly distributed and speed is most important since this table will be accessed every time the cache does physical I/O. Hash table 150 points to conflict chains of error list entries.

TABLE 2

| Variable | VARIABLES Meaning |
|---|---|
| RBA | - RBA of the page to be read |
| BUFFER POINTER | - Pointer to where the data will be read into |
| PAGE SIZE | - Number of sectors in a page (2, 4 or 8) |
| RBA MASK | - = NOT (PAGE SIZE-1) (i.e. 0FFFFFFFC) |
| RBA SHIFT | - = log₂ (PAGE SIZE) (i.e. 1, 2 or 3 for PAGE SIZE 2, 4 or 8) |

TABLE 2-continued

| Variable | VARIABLES Meaning |
|---|---|
| SEC COUNT MASK ERROR MASK | - PAGE SIZE-1 <br> - = Number of bits = PAGE SIZE right justified in a word (i.e. 0003, 000F, 00FF for PAGE SIZE 2, 4 or 8) |

Table 3 (following) defines the structure of each entry in the error list.

TABLE 3

| ERROR LIST STRUCTURE | | |
|---|---|---|
| Field | Contents | Bytes |
| 1 | Present Flags | 2 |
| 2 | Drive ID | 1 |
| 3 | Block Address | 4 |
| 4 | Conflict Next | 2 |
| 5 | Conflict Previous | 2 |

| Field | Meaning |
|---|---|
| 1 | This field contains a set of flags or bits that indicate which sectors in a page have errors. The "BAD" sectors are indicated with 0 bits in the positions in the field and sectors in which valid data is present, are indicated by 1 bit. |
| 2 | This field contains the drive number of the drive where the page is located. |
| 3 | This is the RBA of the first sector of the page. |
| 4 | This field points to the next error list structure or entry in the conflict chain. |
| 5 | This field points to the previous error list structure in the conflict chain |

Figure 8:
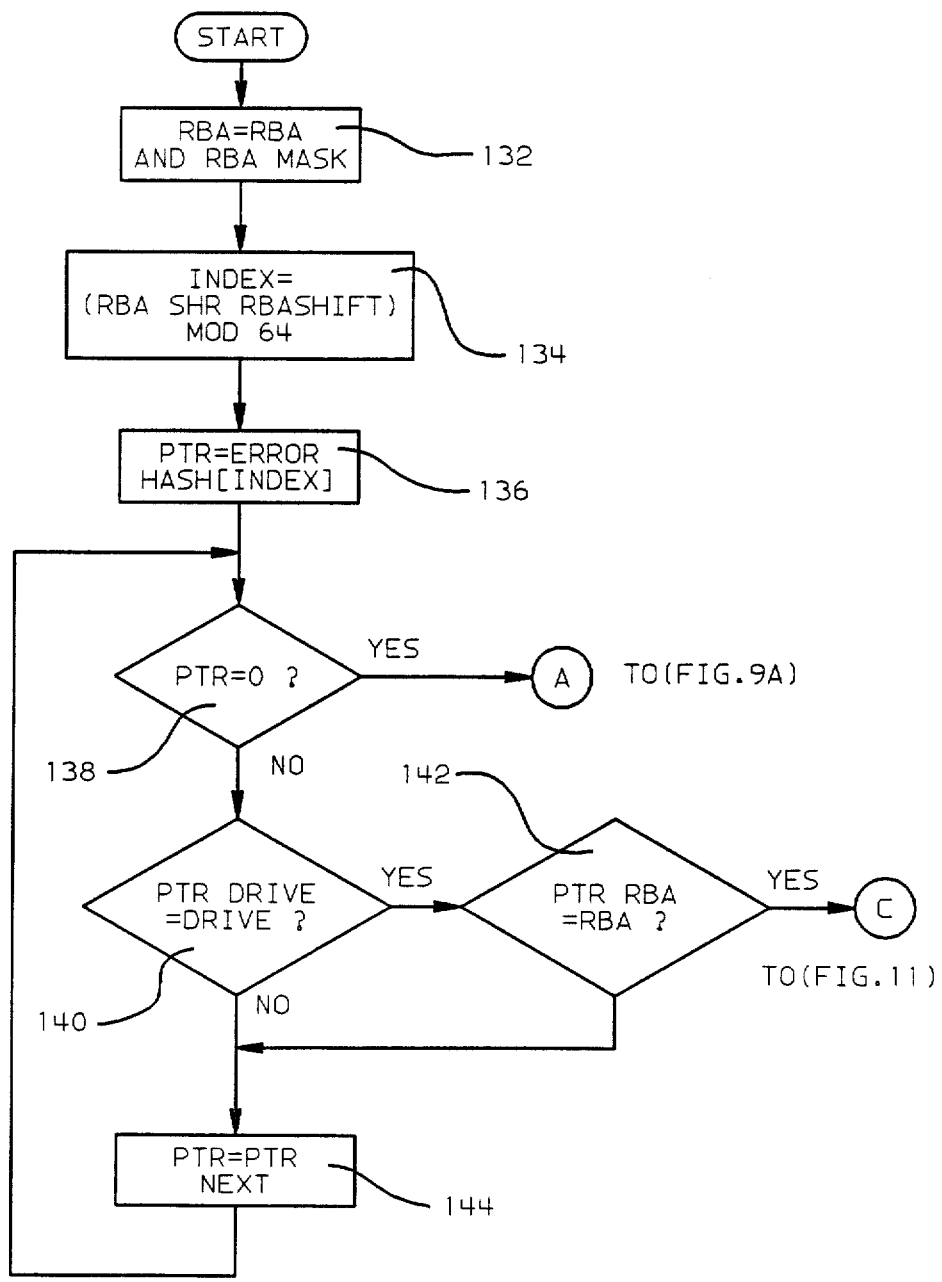

Referring now to FIG. 8, the start of the process for reading in a new page begins with step 132. The general process shown in FIG. 8 determines whether the cache has previously seen an error in the page to be read in. In step 132, the RBA of the desired sector is ANDed with the RBA mask and the result is used in step 134 to calculate the index into error hash table 150. The index is calculated as the remainder from doing a modulo 64 operation upon shifting right the result from step 132 by the amount of the RBA shift. Next, variable PTR, in step 136, is set to the contents of the error hash table located at the index calculated from 134. If the PTR is not set to zero, then step 138 branches to 140 and represents the condition where there is an error entry on the conflict chain. Step 140 then determines if the drive ID is the same as that of the drive containing the page in which an error has occurred. If it is not, then step 144 indexes the pointer and thereupon steps through the next entry in the conflict chain. If the result of step 140 is positive, then 142 determines if the desired RBA corresponds with that of the error list entry. If not, then they go onto the next entry in the conflict list. The positive output from step 138 indicates that the associated page has not had an error before and therefore an attempt will be made to read the full page by sending a single command to the disk controller to read the number of sectors in a page. Positive determination from step 142 indicates that the page had an error before and that it will be read sector by sector by sending plural commands to the disk controller to read only one sector each time.

Figure 9A:
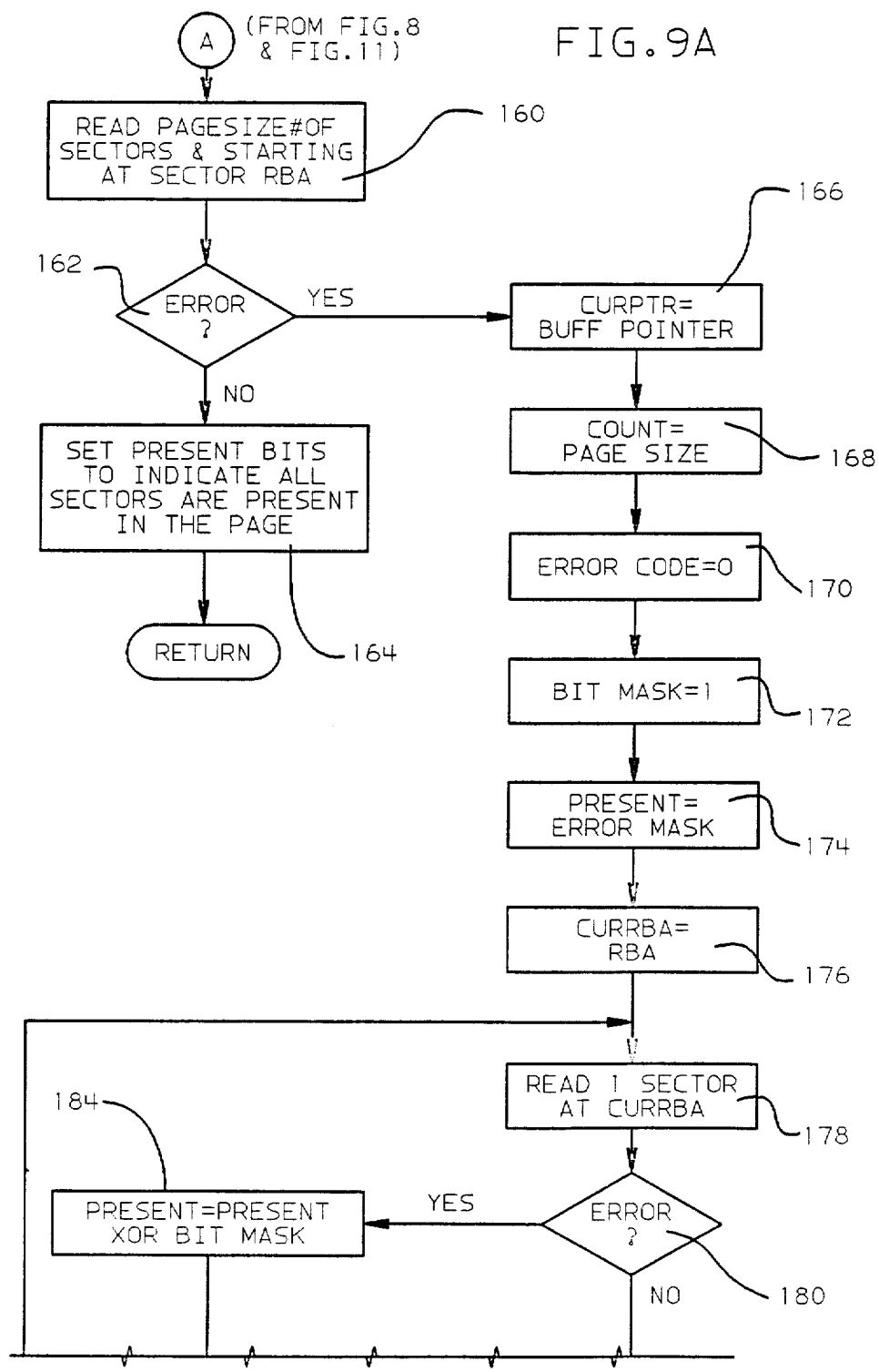
Figure 9B:
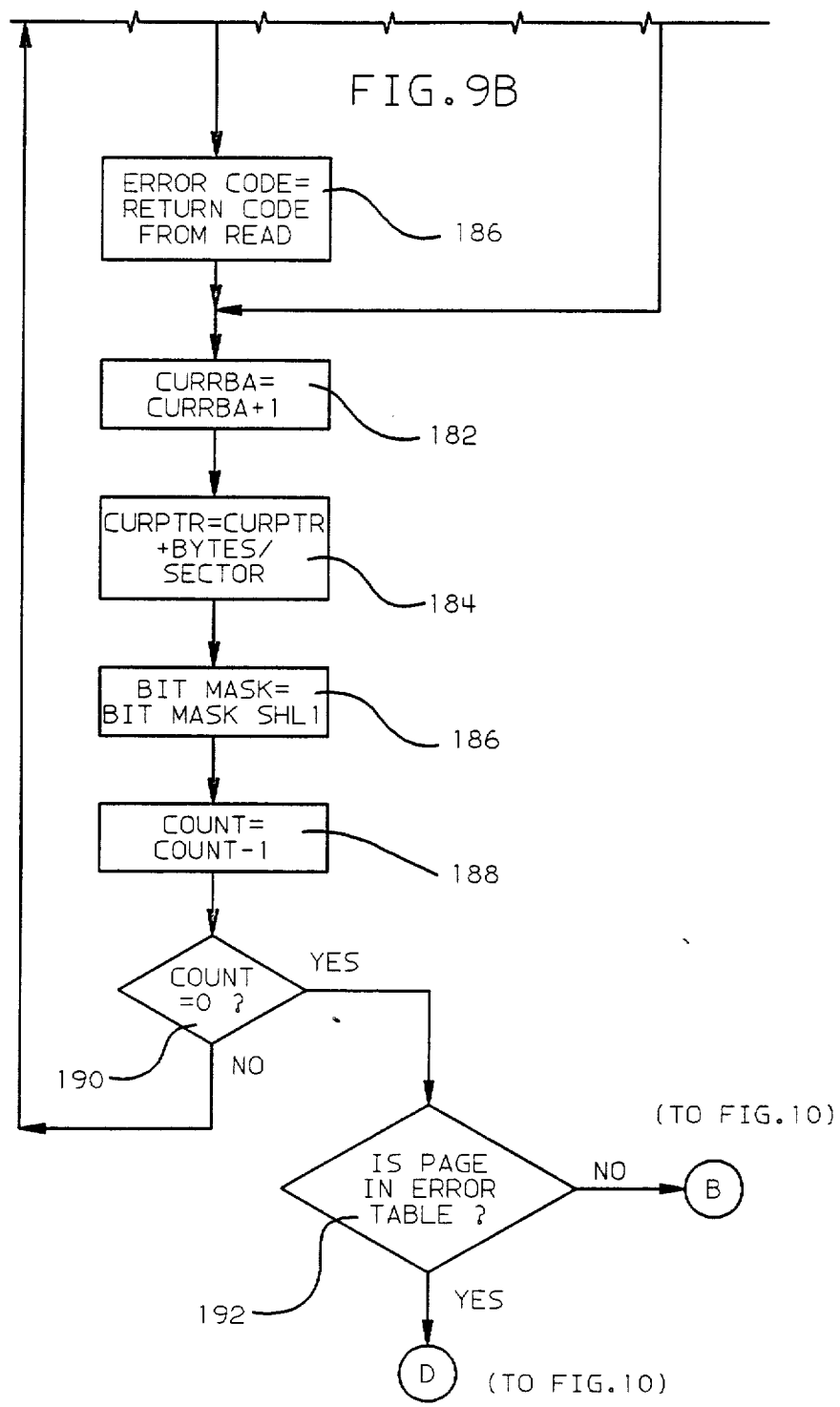

Referring now to FIG. 9, by a call to BIOS, step 160 obtains the PAGE SIZE, number of sectors per page and the RBA of the starting sector. If no error occurred during the reading, then step 162 branches to 164 which thereupon sets the present bits indicating that all sectors are present in the page. That is, there is no bad sector or error encountered during reading such sector and valid data is present in each sector. Step 166 sets the variable CURPTR to point to the address of the data buffer 21 into which a sector will be read. Steps 168–176 then initialize various variables as indicated. Next, a call is made to BIOS and in step 178 one sector is read associated with the current RBA. If no error occurs, step 180 thereupon branches to step 182. If an error occurs during such reading, the present flag associated with such error is set to zero in step 184 by exclusive-ORing with a bit mask, to indicate that the error or sector was bad. Step 186 then sets an error code in accordance with the return code stemming from the read operation of step 178. Steps 182–188 update the current RBA, current pointer, bit mask and count to point to the next sector whereupon the process is repeated by step 190 until the count is reduced to zero. Step 192 then decides whether the page that has just been read is in the error table 31.

If the page is not in the error table, then step 192 branches to step 193 (FIG. 10) which gets an element from error free list 154 by setting a new error pointer. Step 194 then determines was the error free list empty i.e., is new error pointer equal to zero. If it is, then the branch is made from 194 to step 204 which returns the present bits and error code. If the error free list is not empty, steps 196–202 then insert a new error entry into the error hash table. This is done by setting the error free pointer to equal the error free pointer next in step 186, setting the new error pointer present to equal the corresponding present bit in step 198, setting the new error pointer next in accordance with the value from the index of the error hash table, and then setting the error hash index to the new error pointer in step 202.

The procedure shown in FIG. 11 checks the requested sectors for previous errors. Steps 206–218 are identical to steps 118–130 but vary according to the entry and exit points. Thus steps 118–130, because of this variation, check to see if the requested sectors are in the cache page and produce a positive result from step 130 when all of the sectors are in a page. The negative result indicates that not all of the requested sectors are in a page so that the operating system must be trying to perform some form of error recovery. On the other hand, steps 206–218 are used to check if the requested sectors have had previous errors. The positive result from step 218 indicates the page has errors but the requested sectors do not whereas the negative result from 218 indicates the requested sectors have errors.

In Step 206, the RBA and mask SECCOUNT are ANDed and the result stored in the variable shiftcount. Step 208 then sets the present bits to equal the pointer present shifted right by the amount of the shift count. Step 210 sets maskshift equal to the PAGE SIZE minus the number of sectors. Step 212 produces a test mask by shifting right the error mask by an amount according to the maskshift. Thereupon, the present bits are ANDed with a test mask in step 214 and then exclusive-ORed with the test mask in step 216 whereupon step 218 tests the results. This procedure is advantageous because it quickly determines if there are errors in the requested sectors without resorting to loops or multiple decision paths. It might also be better understood with use of the following example in which it is assumed that the PAGE SIZE is 8 sectors, sector 5 of the page (the sixth sector) had an error the last time the page was read and so its corresponding present bit is set to zero. Table 4 provides an example of how the procedure works when a requested sector is in a page that has errors but the requested sector is not one of the errors. The example will read two sectors starting at sector 3 of the page. Table 5 shows an example of this procedure when a requested sector has had an error during a previous read. The example will read two sectors starting at sector 4 of the page.

TABLE 4

| NO ERRORS IN REQUESTED SECTORS | | | | |
|---|---|---|---|---|
| 0 0 0 0 | 0 0 0 0 | 1 1 1 1 | 1 1 1 1 | error mask |
| 0 0 0 0 | 0 0 0 0 | 0 0 0 0 | 0 0 1 1 | test mask |
| 0 0 0 0 | 0 0 0 0 | 1 1 0 1 | 1 1 1 1 | present flags |
| 0 0 0 0 | 0 0 0 0 | 0 0 0 1 | 1 0 1 1 | step 212 |
| 0 0 0 0 | 0 0 0 0 | 0 0 0 0 | 0 0 1 1 | step 214 |
| 0 0 0 0 | 0 0 0 0 | 0 0 0 0 | 0 0 0 0 | step 216 |

TABLE 5

| ERRORS IN REQUESTED SECTORS | | | | |
|---|---|---|---|---|
| 0 0 0 0 | 0 0 0 0 | 1 1 1 1 | 1 1 1 1 | error mask |
| 0 0 0 0 | 0 0 0 0 | 0 0 0 0 | 0 0 1 1 | test mask |
| 0 0 0 0 | 0 0 0 0 | 1 1 0 1 | 1 1 1 1 | present flags |
| 0 0 0 0 | 0 0 0 0 | 0 0 0 0 | 1 1 0 1 | step 212 |
| 0 0 0 0 | 0 0 0 0 | 0 0 0 0 | 0 0 0 1 | step 214 |
| 0 0 0 0 | 0 0 0 0 | 0 0 0 0 | 0 0 1 0 | step 216 |

Figure 10:
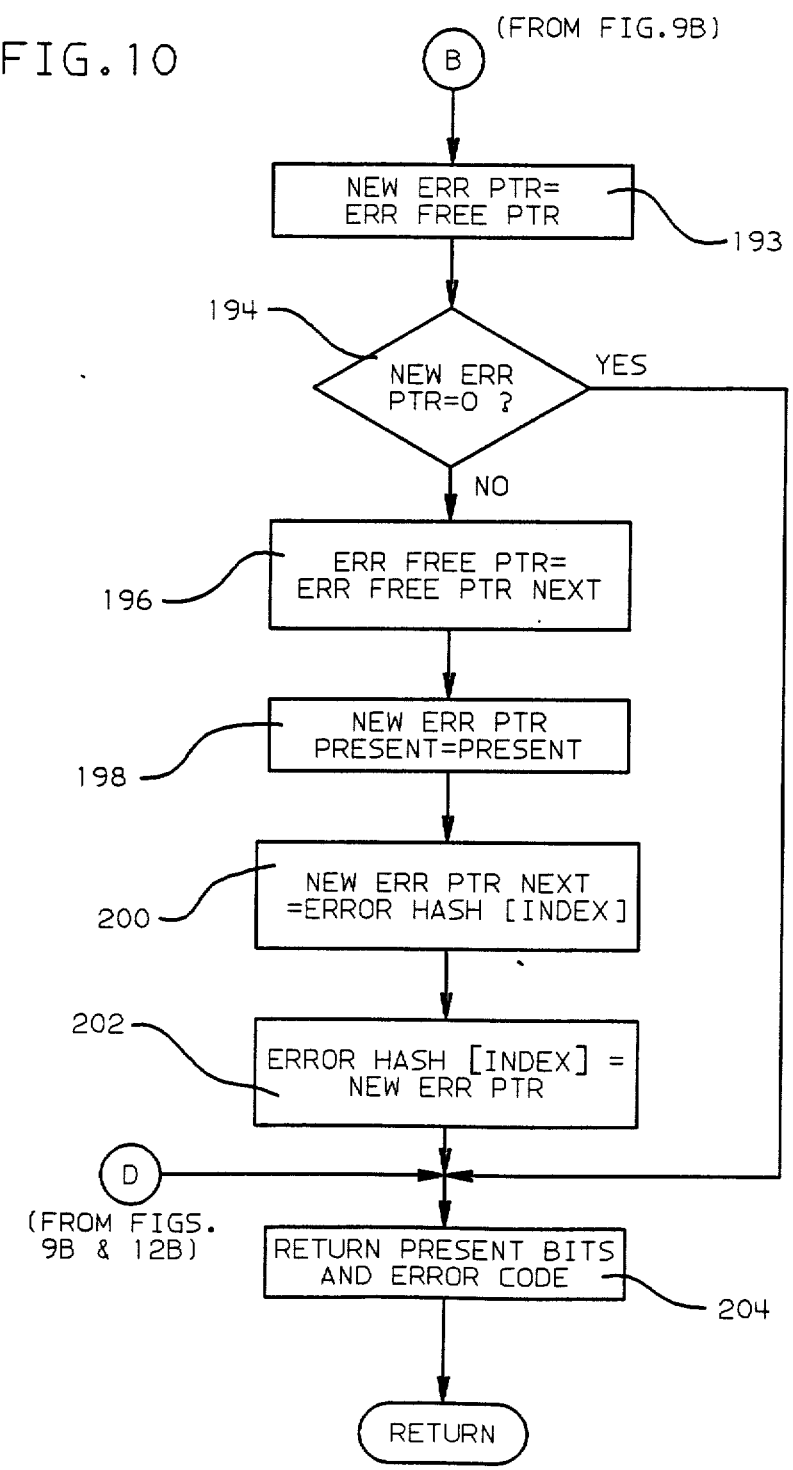
Figure 12A:
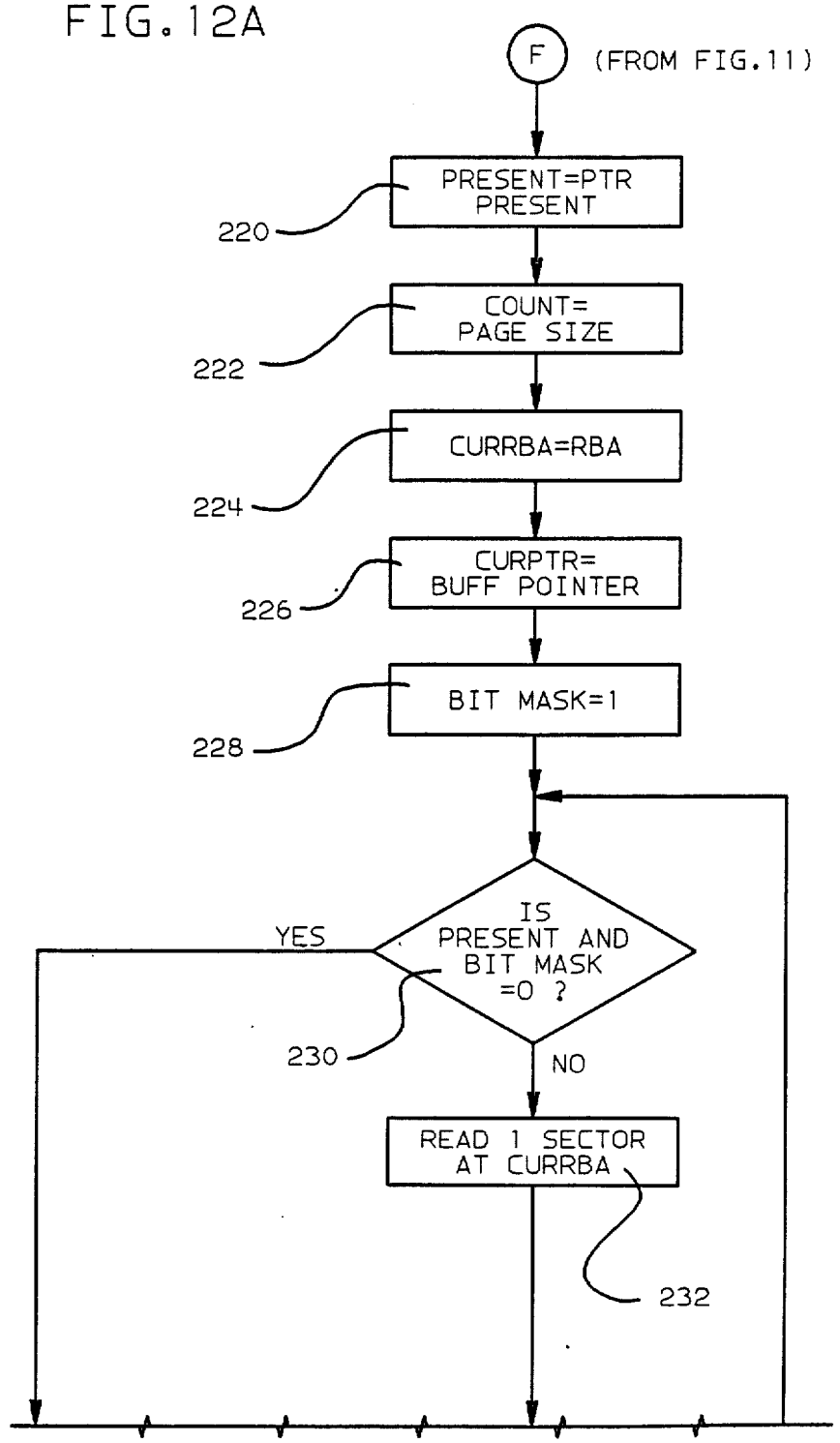

Referring now to FIG. 12, step 220 results from a negative determination in step 218 (FIG. 11) and causes a present bit to be set in accordance with the PTR present. Step 222 sets the count equal to PAGE SIZE, step 224 sets the CURRBA to equal the RBA, step 226 sets CURPTR equal to pointer into the data buffer and step 228 sets the bit mask to equal one. Step 230 then determines whether the current sector had an error before by ANDing the present bit and bit mask. If the result does not equal zero, step 232 then reads, by means of a BIOS call, one sector at the CURRBA. The step 234 then determines if there was an error during such reading. If there was, step 236 sets the present flags to indicate that there was an error and also saves the error code in step 238. Step 240, and following, moves to the next sector by incrementing the CURRBA in step 240. The CURPTR is then incremented by the number of bytes per sector in 242 and the bit mask is shifted left one in step 244. The count is decremented in step 246. When it reaches zero, a branch is made in step 204 (FIG. 10). Otherwise, step 248 then determines that all the sectors have not been read and therefore branches back to step 230 to repeat the process.

The following summarizes operation of the procedures. Media defects are managed with the present flags in the cache pages structure. When an attempt is made to read in a page from the disk, if an error is returned the cache recovers in the following manner:

1. It "backs up" to the first sector of the page.
2. It starts reading the sectors into the page buffer one at a time. Each time it reads in a sector successfully, it sets a corresponding present flag.
3. If an error is encountered while reading a sector, the present flag for that sector is cleared (set to 0) and appropriate pointers are updated as if the sector were read in.
4. Once all of the sectors in the page have been read (one at a time), the present bits are scanned to determine if one, or more, of the sectors requested from the cache is missing, i.e., the corresponding present bit is set to 0. If so the last error received while reading from the device is returned to the requestor.

The procedure is slightly different if the page that corresponds to the request is already in the cache. It is handled in the following manner:
1. The present flags are scanned to determine if one more of the requested sectors is missing. If none is missing, then the cache operates in a normal manner and the data is returned to the requestor.
2. If one or more sectors are missing, only those sectors that need to be read from the disk are read. If no errors are encountered while reading, the appropriate sectors are marked present in the cache page and processing continues.

This scheme allows the cache to have "holes" that correspond to the errors in the media without loss of data or by significantly adding to the complexity of the cache. It also allows the operating system to attempt to retry operations and recover data in an error situation without the cache making the operating system's task more difficult.

When the cache encounters an error it determines which sector(s) of the page are in error and leaves "holes" in the page that correspond to the sectors in error. Also produced by the error recovery process is a 16 bit value that is referred to as the present flags. If there are any zero bits in these flags, then the page has one or more errors.

If there are errors in the page, the cache determines if this page has had errors before. It does this by hashing into an error list with the page's RBA to see if that page is in the list. If the page is not on the list, it is added to the list. If the page had had errors before, one of the following can be done:
1. Keep the previous present flags.
2. Replace the present flags with the ones just produced. This is what the software cache implemented.
3. Logically AND the two sets of the present flags and save the result. This implies that if a sector in a page ever had an error it will not be read unless it is specifically requested.
4. Logically OR the two sets of present flags and save the result. This implies that if a sector in a page was ever read successfully, the cache will always try to read it.

If all of the bits in the present flag are ever all zero, the entry is removed (or at least not placed) in the error list. This is done for several reasons. The first is that it allows the error list to be much smaller. And since the operating system tends to de-allocate entire tracks when there are manufacturing media defects, the operating system will in general not try to read these areas. The second reason is that if a page has no good sectors in it, then the operating system is in a general error recovery state and performance is not critical. There is also little that the cache could do with the page anyway so the cache does not waste space by keeping track of that error.

When the request is made to the cache that results in a cache miss, the system first determines if the page that it is about to read has ever had errors before. If the page has had previous errors, the system sees if one of the sectors requested was flagged as an error. If none of the sectors requested had an error then the sectors of the page are read in one at a time skipping over the sector(s) that were in error. Thus, the error(s) have been avoided.

Error retries by the initiator of a request are allowed since if a requested sector has had errors it will be read by the cache. All that the error avoidance does is prevent the cache from pre-fetching sector(s) that it has experienced errors on if those sector(s) are not explicitly requested.

It should be apparent to those skilled in the art that other changes and modifications can be made without departing from the spirit and scope of the invention as defined in the appended claims.

What We claim as new and desire to secure by Letters Patent is:

1. In the method of operating a personal computer having a main memory providing a DASD cache for storing pages of sectors of data read consecutively one sector at a time from a disk having storage media defects therein, and wherein an operating system manages the transfer of data between said DASD cache and said main memory for processing under an application program by buffering each sector as it is being transferred, the improvement comprising the steps of:
    providing a request signal for reading data from a predetermined sector from said disk;
    in response to said request signal, reading a page from said disk which page contains said predetermined sector and additional prefetched sectors, said predetermined sector and said prefetched sectors being located in consecutive locations on said disk, and said reading step comprising storing data read from a sector for which no error is encountered in said reading, in said cache, and setting a data indication in said cache for such sector to signify that valid data from such sector is present in said cache;
    selectively generating an error flag whenever attempts are made to read data from sectors containing media defects;
    and, in response to said error flag, setting in said cache at least one error code of which sectors contain media defects.

2. The method in accordance with claim 1 comprising:
    allocating to each page in said cache a predetermined number of consecutive storage locations for storing sectors of data from said disk; and
    said reading step comprising reading said data from said sectors into storage locations allocated thereto, whereby in response to said error codes in said cache said reading step is skipped so that said codes corresponding to said sectors for which at least one error flag is generated, signify the absence of valid data in said storage locations allocated to such sectors.

3. The method in accordance with claim 1 comprising:
    providing in said cache for each page therein a plurality of present bits corresponding in number to the number of sectors in a page, each bit corresponding to a different predetermined one of said sectors in each page, and setting each bit to signify either the presence and absence of valid data in said corresponding sector of data which has been stored in said cache.

4. The method in accordance with claim 3 comprising:
    providing a second request signal for a sector of data stored in said cache;
    and, in response to said second request signal, accessing the one of said present bits corresponding to the requested sector to ascertain the validity of data therein.

5. The method in accordance with claim 1 comprising:

creating and storing in said cache a history of those pages which at one time were stored in said cache and which pages contained at least one sector in connection with the reading of which at least one error flag was generated;

and, in response to said request signal, accessing said history for entries therein for the page containing the requested sector.

6. The method in accordance with claim 5 comprising:

providing in said history indications of the status of all sectors in each page for which there is an entry, such status including an indication of each sector in connection with the reading thereof of at least one error flag was generated.

7. The method of claim 6 comprising:

updating said history indications each time a page is read into said cache for which page there is an existing entry in said history.

* * * * *